R. ASMONDIS.
SAW SETTING AND SHARPENING MACHINE.
APPLICATION FILED DEC. 10, 1918.
1,311,308.
Patented July 29, 1919.
3 SHEETS—SHEET 1.
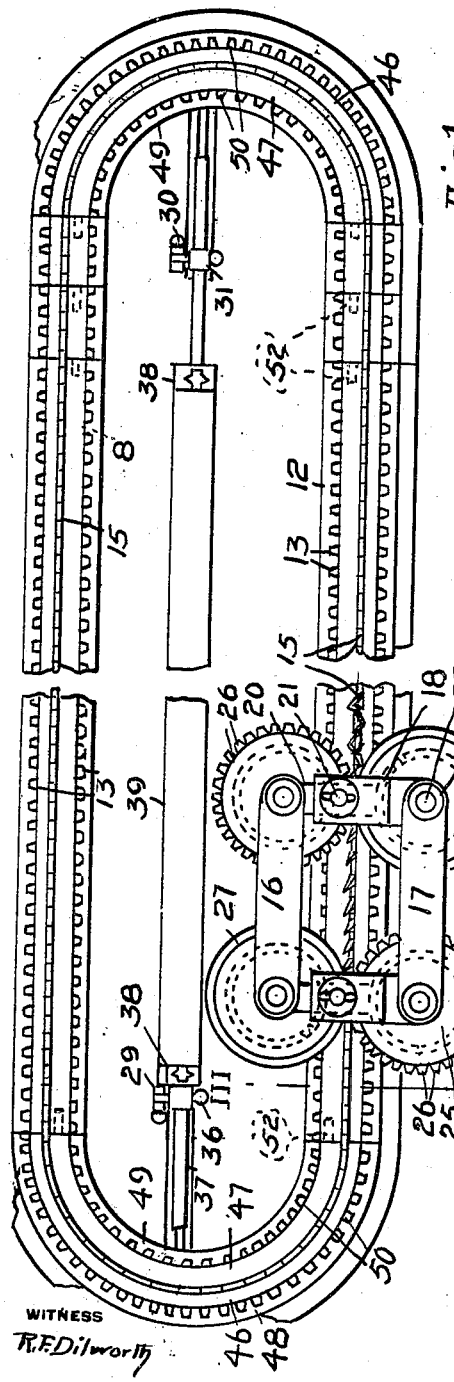
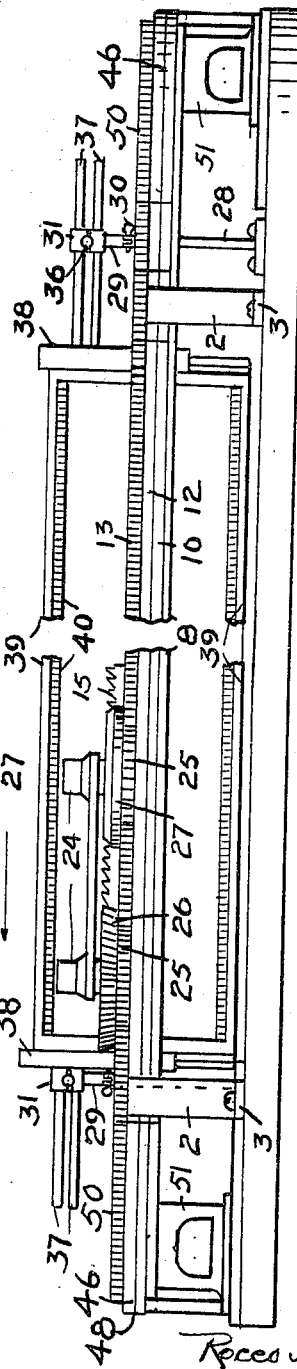
WITNESS
R.F.Dilworth
INVENTOR.
Roces Asmondis
By Max N Frolonitz
Attorney R. ASMONDIS.
SAW SETTING AND SHARPENING MACHINE.
APPLICATION FILED DEC. 10, 1918.
1,311,308.
Patented July 29, 1919.
3 SHEETS—SHEET 2.
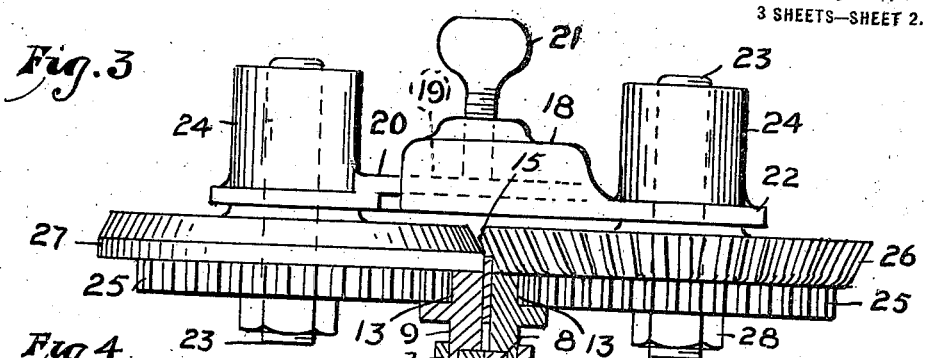
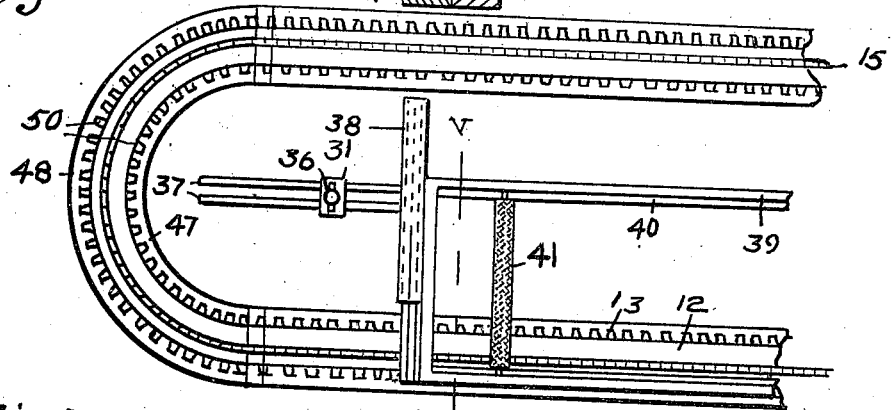
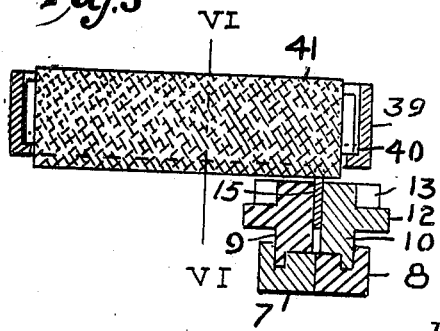
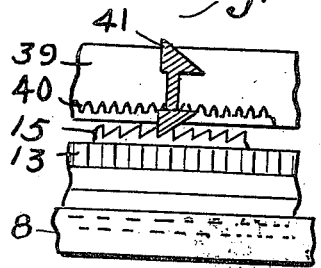
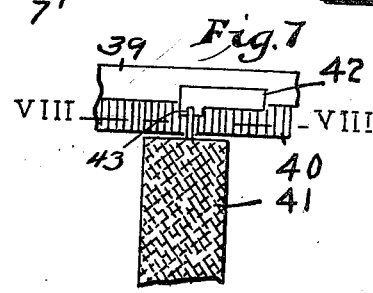
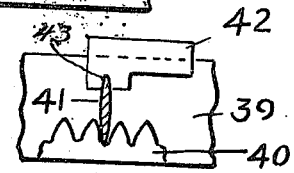
WITNESS
R. F. Dilworth
INVENTOR.
Rocco Asmondis
By Max H. Srolovitz
Attorney

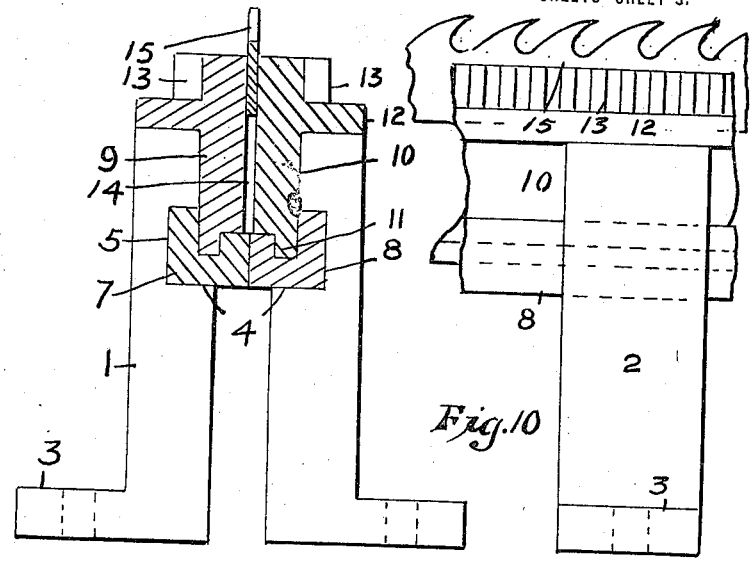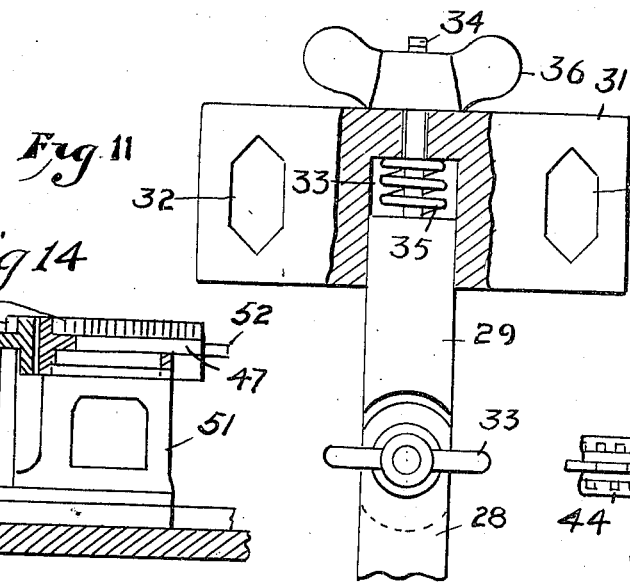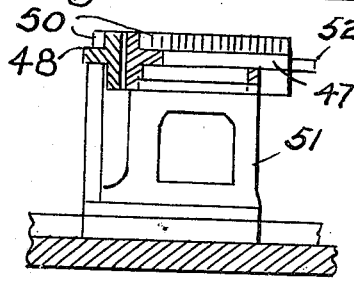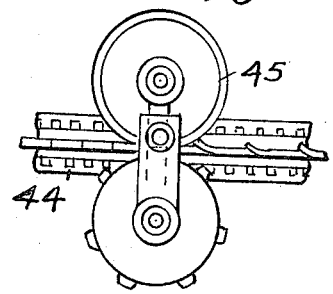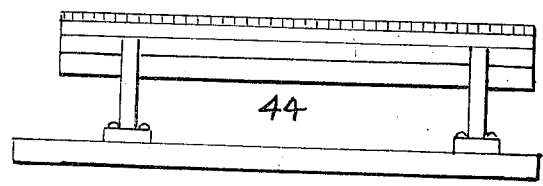

UNITED STATES PATENT OFFICE.

ROCCO ASMONDIS, OF ZELIENOPLE, PENNSYLVANIA.

SAW SETTING AND SHARPENING MACHINE.

1,311,308.  Specification of Letters Patent.  Patented July 29, 1919.

Application filed December 10, 1918. Serial No. 266,033.

*To all whom it may concern:*

Be it known that I, ROCCO ASMONDIS, a citizen of the United States, residing at Zelienople, in the county of Allegheny and State of Pennsylvania, have invented certain new and useful Improvements in Saw Setting and Sharpening Machines, of which the following is a specification.

This invention relates to saw setting and sharpening machines, and has for its object to provide a machine of such class, in a manner as hereinafter set forth, with means whereby saws of different sizes can be quickly and readily sharpened and set.

Further objects of the invention are to provide a saw setting and sharpening machine which is simple in its construction, strong, durable, conveniently operated, efficient in its use, readily set up and comparatively inexpensive.

With the foregoing and other objects in view the invention consists of the novel construction, combination and arrangement of parts as hereinafter set forth and illustrated in the accompanying drawings wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1, is a top plan view broken away of a saw setting and sharpening machine in accordance with this invention.

Fig. 2, is a side elevation broken away.

Fig. 3, is a section on line III—III Fig. 1.

Fig. 4, is a top plan, broken away, with the sharpening device in operative position.

Fig. 5, is a section on line V—V Fig. 4.

Fig. 6, is a section on line VI—VI Fig. 5.

Fig. 7, is a sectional detail of the sharpening device with an inclining attachment for the file.

Fig. 8, is a section on line VIII—VIII Fig. 7.

Fig. 9, is a cross sectional view of the rack for the setting device, the saw holder and a supporting bracket therefor.

Fig. 10, is a side view of Fig. 9.

Fig. 11, is a sectional detail of the sharpening device.

Figs. 12 and 13 are respectively a top plan and a side elevation of a modified form.

Fig. 14, is a detail illustrating the supporting bracket for end of the track.

Referring to Figs. 1 to 4 and 9 and 10 the machine comprises a saw set consisting of a combined track and saw holder, which is adjustable lengthwise so as to provide for band saws of different lengths, supporting brackets for said track and holder, and a tooth setting device.

The supporting brackets, preferably four in number, each is constructed of a pair of oppositely disposed standards 1, 2, provided with right angular extensions 3, through which extend holdfast devices, not shown, for fixedly securing said standards to a bench or other support. The inner face of each standard is cut away to form a shoulder or ledge 4 and a pocket 5, for a purpose to be presently referred to.

The combined saw and track holder element is oval in contour and formed of side and end sections so that the length thereof can be increased or diminished when occasion requires to provide for different lengths of saws. The side sections of said element each comprises a pair of oppositely disposed sectional channel shaped members 7, 8 which are mounted in the pockets 5, seated on the shoulders 4, and project inwardly from the inner faces of the standards 1, 2, and constitute supports for sectional track forming members 9, 10.

Each of the members 9, 10 is formed of a series of sections, corresponding in number to the number of sections of the members 7, 8. The members 9, 10 stand on edge and each has its lower portion formed with an extension 11 which is seated in and on a channel shaped member. The said members 9, 10 are positioned against the inner faces of the standards 1, 2, as well as projecting above the top thereof. Each of the members 9, 10 has a lateral flange 12, which is seated upon the top edge of a standard, and above the flange 12, each member 9, 10 is formed with vertically disposed teeth 13 throughout to form a rack or toothed track.

The standards 1, 2 are spaced apart to receive the members 7, 8, 9, 10, and the members 9, 10 are held in spaced relation with respect to each other to form a space 14 in which is mounted the saw 15.

Each of the end sections is semi-circular in contour and consists of two curved members 46, 47; the former is an outwardly extending flange 48, the latter an inwardly extending flange 49.

The outer face of the member 46 above the flange 48, and the inner face of the member 47 above the flange 49, are provided with vertically disposed teeth 50 forming, when the end sections are connected to the side sections, a continuation of the teeth 13.

The end sections are mounted in slidable supporting brackets 51 therefor.

The members 47 and 50 are spaced apart, and the space between said members forms a continuation of the space between members 8 and 10 of the said sections. The space between members referred to receive the saw 15 and the members 9, 10, as well as the members 46, 47, act as clamps to hold the saw 15 in position to be acted upon by the saw device or the sharpening device. The brackets 51 not only act as supports for the members 46, 47, but also as a clamp therefor.

The end members of the combined track and holder element are detachably connected to the side members by dowels 52. The sections of each of the side members are detachably connected together by dowels 52. By this arrangement the sections, which form the track and holder element can be conveniently removed and replaced when desired.

The tooth setting device, which is portable and is manually propelled around the track to set the teeth of the saw, consists of a body portion rectangular in contour and formed of two sections 16, 17, the latter having its horizontal arms 18 provided with pockets 19, into which are adjustably mounted the horizontal arms 20 of the section 16. The arms 20 are adjustably connected in the arms 18 by set screws 21, and by this arrangement the width of the body portion can be adjusted when desired. Each of the sections 16, 17, is provided with a pair of bosses 22 and through which extends a shaft 23, carrying a nut 24, bearing on a boss 22, to maintain the shaft from downward movement. The shafts 23 are fixed in the sections 16, 17, and depend therebelow. Loosely mounted on each of said shafts 23, is a pinion 25, which meshes with the teeth 13. The pinions 25 are arranged in pairs, and one is provided with a beveled and toothed saw set which is of greater diameter than the pinion and is indicated at 26. The other pinion is formed with a disk 27, having a straight and a beveled edge. The disk 27 is of greater diameter than its respective pinion and overlaps the top of the teeth 13. The saw set overlaps the top of the teeth 13. The saw sets 26, are what may be termed tooth setting disks, and are oppositely disposed with respect to each other and like arrangement is provided with respect to the disk 27. These latter act in a manner as an anvil.

When the saw setting device is in operative position, a toothed setting disk is arranged in advance of an anvil disk on one side of the track, and on the other side thereof an anvil disk is arranged in advance of the other tooth setting disk.

The pinions are maintained in position on the shafts 23 by nuts 28.

The arrangement of the disks 27 is such that each disk will act on every alternate tooth, whereby one disk 27 will act on one tooth in one direction, the other disk will set the adjacent tooth in the opposite direction.

The saw sharpening device, Figs. 1, 2, 4, to 8 and 10, consists of a pair of brackets secured within and projecting above the oval shaped track on which runs the saw setting device. Each of said brackets is formed of a lower section 28 and an upper section 29. The latter is hinged to the former as at 30, whereby the section 28 can be adjusted at an angle to the section 29 and maintained in the position to which it has been adjusted. Mounted on the section 29 is an adjustable head 31, formed with a pair of polygonal shaped openings 32 and a socket 33 into which extends the section 29. Extending through the head 31 and engaging in the section 29 is a threaded bolt 34, and surrounding said bolt 34 and arranged in the socket 33, against the section 29, is a coiled spring 35. Carried by the threaded upper end of the bolt 34 is a wing nut 36 which when adjusted will regulate the position of the head 31.

Extending through the openings 32 is a pair of longitudinally adjustable rods 37, to the inner ends of which is secured a channel shaped carrier 38. Slidably mounted in the carriers 38 is a rectangular frame 39 having the inner face of each side bar thereof provided with a toothed rack 40, which constitutes a series of opposed seats for a sharpening element in the form of a file 41.

When the teeth of the saw are to be sharpened the section 29 is swung on its pivot to the position shown in Fig. 4, and is then locked in such position. The frame 39 is then so arranged that it can be moved horizontally with respect to the track for the saw set, whereby the file 41 will act on the teeth of the saw for the purpose of sharpening them. The rods 37 enable the frame 39 to be shifted longitudinally so that the file can act on successive teeth of the saw.

That portion of the saw which is so arranged at the curves of the track can either be operated on manually or can be shifted to a position in the path of the file carried by the frame 39.

The ends of the file are reduced so that they will be readily positioned in the seats formed by the gullets between the teeth. The depth of the gullets is sufficient, in connection with the side bars of the frame, to maintain the file in the desired position to act on the teeth of the saw. In some instances it may be required to tilt or incline the file slightly; if so, an L-shaped member 42 is employed and which is notched as at 43 to take over an end of the file. See Figs. 7 and 8. The member 42 may be detachably connected to the frame 39 or held in position by the operator.

Referring to Figs. 12 and 13 a straight track 44 is provided for the saw set 45, and in this connection the latter consists of two pinions one toothed setting disk and one beveled disk. When the saw set is run in one direction it sets every alternate tooth. It is then reversed and run in the opposite direction and sets the other teeth of the saw.

The tooth setting disks used may have their peripheries set up, in a manner to provide for different shape and size saw teeth. In Fig. 3 the tooth setting disk has its periphery of a different shape from the tooth setting disk shown in Fig. 12.

The pinions traveling against the toothed racks of the members 9 and 10 tend to assist in clamping the saw in position.

The arrangement of the saw set in Figs. 1 and 3 is such that the tooth setting disk in advance will set a series of alternate teeth prior to the action of the tooth setting disk arranged at the rear of the saw set.

As the head 31 is adjustable the frame 39 can be positioned in such a manner so that the file 41 will properly contact with the teeth of the saw to sharpen them.

The pinions 25 can be removed when desired, especially when a change of tooth setting disks is required.

What I claim is:—

1. A machine for the purpose set forth comprising means to provide a combined track and saw holder, and a portable saw set traveling against said track and including rotatable disks adapted to act upon the teeth of a saw supported by the holder, one of said disks having a toothed periphery and the other a beveled periphery.

2. A machine for the purpose set forth comprising means to provide an extensible and contractible combined track and saw holder, and a portable saw set traveling against said track and including rotatable disks adapted to act upon the teeth of a saw supported by the holder, one of said disks having a toothed and the other a beveled periphery.

3. A machine for the purpose set forth comprising means to provide a combined track and saw holder, and a portable saw set comprising a front and a rear pair of rotatable disks capable of acting on the teeth of a saw supported by said holder, one of the disks of each pair having a toothed periphery and the other disk of the pair having a beveled periphery.

ROCCO ASMONDIS.

Copies of this patent may be obtained for five cents each, by addressing the "Commissioner of Patents, Washington, D. C."